United States Patent … Leung et al.

(10) Patent No.: US 10,938,728 B2
(45) Date of Patent: Mar. 2, 2021

(54) HIGH PERFORMANCE FOR EFFICIENT AUTO-SCALING OF STATEFUL SERVICE

(71) Applicant: Cisco Technology, Inc., San Jose, CA (US)

(72) Inventors: Kent Leung, Palo Alto, CA (US); Zhijun Liu, Cupertino, CA (US); Andrew E. Ossipov, Lewisville, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/520,408

(22) Filed: Jul. 24, 2019

(65) Prior Publication Data

US 2021/0029047 A1    Jan. 28, 2021

(51) Int. Cl.
  *H04L 12/851*  (2013.01)
  *H04L 12/715*  (2013.01)
  *H04L 12/721*  (2013.01)

(52) U.S. Cl.
  CPC .......... *H04L 47/2483* (2013.01); *H04L 45/38* (2013.01); *H04L 45/64* (2013.01); *H04L 47/2441* (2013.01)

(58) Field of Classification Search
  None
  See application file for complete search history.

(56) References Cited

U.S. PATENT DOCUMENTS

| | | | |
|---|---|---|---|
| 9,374,302 B2 | 6/2016 | Bays et al. | |
| 9,379,982 B1 | 6/2016 | Krishna et al. | |
| 9,860,209 B2 | 1/2018 | Buchanan et al. | |
| 9,876,714 B2 | 1/2018 | Parsa et al. | |
| 10,375,745 B1* | 8/2019 | Lakkaraju | H04W 88/06 |
| 2003/0227880 A1* | 12/2003 | Heller | H04L 47/14 370/328 |
| 2010/0098092 A1* | 4/2010 | Luo | H04L 12/4633 370/401 |

(Continued)

OTHER PUBLICATIONS

Vladimir Olteanu et al., "Stateless Datacenter Load-balancing with Beamer", Proceedings of the 15th USENIX Symposium on Networked Systems Design and Implementation (NSDI '18), https://www.usenix.org/conference/nsdi18/presentation/olteanu, Apr. 9-11, 2018, 16 pages.

*Primary Examiner* — Otis L Thompson, Jr.
(74) *Attorney, Agent, or Firm* — Edell, Shapiro & Finnan, LLC

(57) ABSTRACT

A method is provided including obtaining at a newly added flow mapper node of a plurality of flow mapper nodes, from a first flow locator node of a plurality of flow locator nodes, a flow owner lookup request for flow state information that includes identification of a particular flow locator that is to handle processing of a packet flow. The newly added flow mapper node determines whether it has stored flow state information. When the newly added flow mapper node does not have stored flow state information, the newly added flow mapper node identifies a particular flow mapper node of the plurality of flow mapper nodes which has stored flow state information for the particular packet flow and services the flow owner lookup request using flow state information stored by the particular flow mapper node.

20 Claims, 6 Drawing Sheets

(56) References Cited

U.S. PATENT DOCUMENTS

| | | | |
|---|---|---|---|
| 2010/0271964 A1* | 10/2010 | Akhter | H04L 43/0817 370/252 |
| 2013/0304909 A1* | 11/2013 | Pappu | H04L 47/823 709/224 |
| 2015/0350078 A1* | 12/2015 | Azgin | H04L 67/2842 370/392 |
| 2016/0371496 A1* | 12/2016 | Sell | G06F 12/14 |
| 2017/0019469 A1* | 1/2017 | Sunay | H04L 5/0044 |
| 2019/0036819 A1 | 1/2019 | Kancherla et al. | |
| 2019/0230039 A1* | 7/2019 | Wang | H04L 49/70 |

* cited by examiner

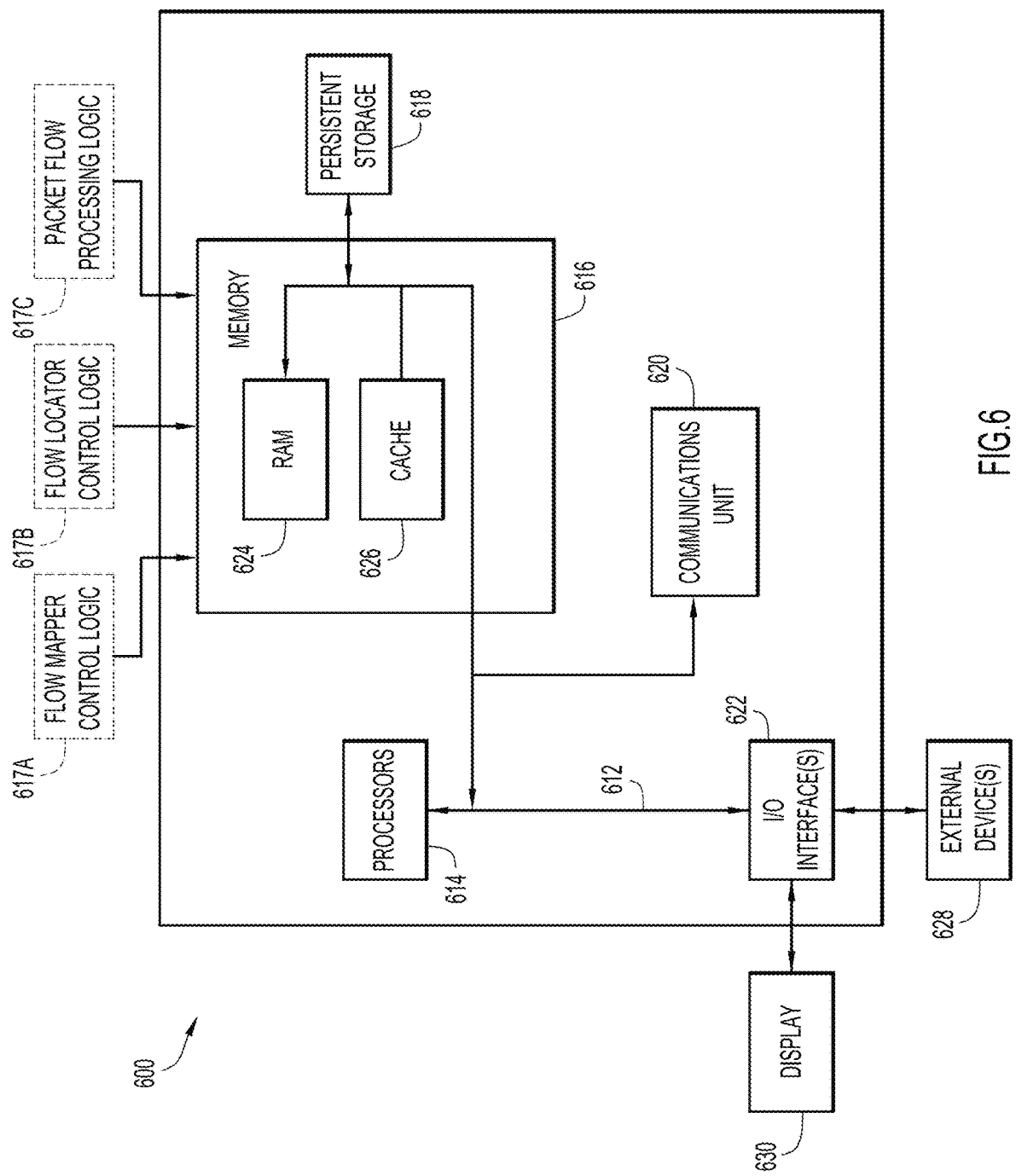

HIGH PERFORMANCE FOR EFFICIENT AUTO-SCALING OF STATEFUL SERVICE

TECHNICAL FIELD

The present disclosure relates to clustering of compute services/functions.

BACKGROUND

Clustering of compute services/functions used for packet processing provides high performance with stateful scalability and availability. However, cluster membership change events that happen with auto-scaling can trigger high compute processing and excessive network bandwidth consumption due to bulk synchronization (i.e. flow state transfer) upon member addition/removal.

BRIEF DESCRIPTION OF THE DRAWINGS

FIG. 6 is a diagram of a computing device/apparatus that may be configured to perform the functions of a flow mapper node described herein, according to an example embodiment.

DESCRIPTION OF EXAMPLE EMBODIMENTS

Overview

Techniques are presented to minimize degradation to cluster performance when auto-scaling (which is inherent in cloud environments) of cluster members. In an example embodiment, a method is provided for efficient auto-scaling of a stateful service. The method involves obtaining at a newly added flow mapper node of a plurality of flow mapper nodes, from a first flow locator node of a plurality of flow locator nodes, a flow owner lookup request for flow state information that includes identification of a particular flow locator node that is to handle stateful processing of a packet flow. The newly added flow mapper node determines whether it has stored flow state information. Upon determining that the newly added flow mapper node does not have stored flow state information, the newly added flow mapper node identifies a particular flow mapper node of the plurality of flow mapper nodes which has stored flow state information. The newly added flow mapper node services the flow owner lookup request using flow state information stored by the particular flow mapper node.

Example Embodiments

Presented herein are techniques to enable simplified and more efficient auto-scaling of computing entities/functions/services that are used for processing of packet flows. Examples of such processing may include processing of packet flows for network security, such as premise-based or cloud-based functions/services performed for firewall, including intrusion prevention, intrusion detection, and other network security functions/services.

As used herein, the term "node" is meant to include a standalone computing entity (e.g., server computer) that can run one or more processes (services) as well as a server software process (service) that may run on one or more computing entities (e.g., in a cloud computing environment).

Figure 1:
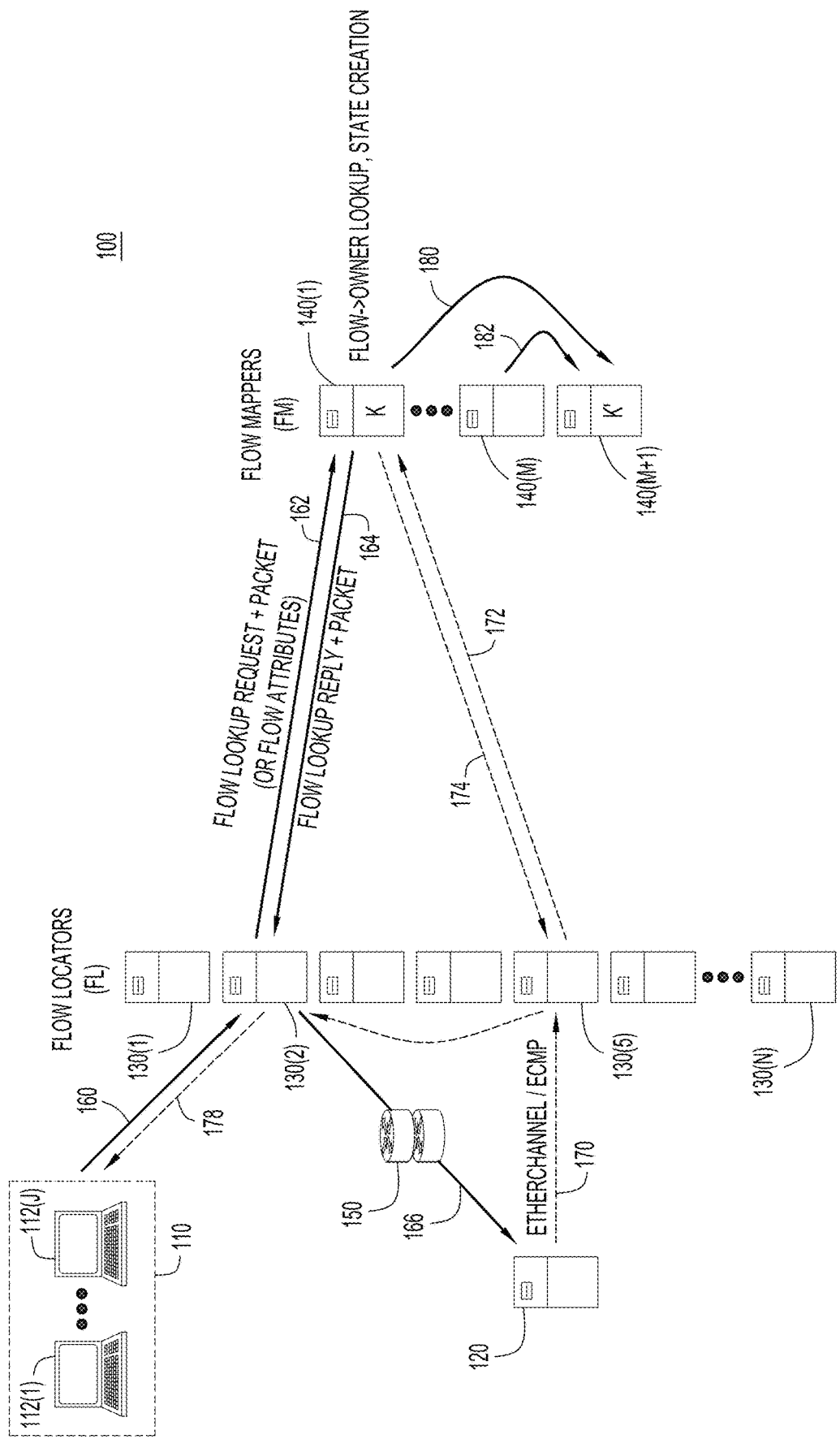
FIG. 1 is a diagram of networking environment that includes a cluster of packet processing entities used to process packet flows under the direction of flow locator nodes and flow mapper nodes, according to an example embodiment.

Reference is first made to FIG. 1. FIG. 1 shows a network environment 100 that includes an enterprise network 110 in which one or more endpoints 112(1)-112(J) may operate. The endpoints 112(1)-112(J) may be laptop computers, desktop computers, mobile devices (smart phones), Internet of Things (IoT) devices, server computers, etc. The endpoints 112(1)-112(J) may participate in a communication session (packet flow) with a flow destination endpoint 120. The enterprise network may also include workloads that are hosted in a cloud.

In FIG. 1, there are shown a plurality of flow locator nodes 130(1)-130(N) and a plurality of flow mapper nodes 140(1)-140(M). A flow mapper node may be located in the same computing node/entity as a flow locator node, or it may be located separately in accordance with a split CP/DP model. The combination of the flow locator nodes 130(1)-130(N) and flow mapper nodes 140(1)-140(M) may be viewed as a cluster of computing entities. This cluster may be cloud-based (and remote from the enterprise network 110) or on-premise with the enterprise network 110. The flow locator nodes 130(1)-130(N) perform packet processing on a packet flow, such as processing performed for network security functions, including firewall functions (including deep packet inspection), intrusion detection, intrusion prevention, etc.

The following definitional terms are provided.

A Flow Owner (FO) is a cluster member that is tasked with processing all packets for a given stateful flow and associated subflows.

A Flow Forwarder (FF) is a non-owner cluster member that may receive packets for a given flow by virtue of stateless load balancing. A FF typically stores a summary state of the flow to facilitate packet forwarding toward a FO.

A Flow Locator (FL) is defined as a data plane (DP) function of a cluster member that attempts to recover an existing flow state/context in order to facilitate security processing on an incoming packet from the enterprise network 110. A FL sets the forwarding table to forward packets for the flow to the correct FO for a given packet flow. In FIG. 1, the flow locator nodes 130(1)-130(N) are FLs.

A Flow Mapper (FM) is defined as a control plane (CP) function of a cluster member that stores and provides flow state/context for backup and FO discovery purposes by a FF. Each FM in a cluster serves a particular subset of flows, typically distributed/mapped using a consistent hash (denoted "cHash") function that is shared by all cluster members. The FM maintains a lookup table (LUT) of packet flow to FO. Flow mapper nodes 140(1)-140(M) are FMs in the example network environment shown in FIG. 1.

Communication between flow locator nodes 130(1)-130(N) and the flow destination endpoint 120 is by way of networking devices 150. This communication may use, for example, Etherchannel and/or Equal Cost Multi-Path (ECMP) networking techniques.

A flow locator node looks up the identity of a flow owner for a given packet flow from a flow mapper node when the flow locator node does not know the owner of a received packet flow. The identity of a flow mapper node for a given packet flow is determined using a hash function. Both the flow locator nodes and the flow mapper nodes have the knowledge of and use the same hash function to determine the identity of a flow mapper node for a given packet flow. For example, as shown in FIG. 1, the identity "K" of a flow mapper node for a given packet flow is computed by the computation K=$Hash_{1...M}$ (one or more attributes of the packet flow), corresponding to flow mapper node 140(1) as shown in FIG. 1, where "1 . . . M" denotes the list of M flow mapper nodes. When a new flow mapper function is added, the identity for that new flow mapper node is determined by, K'=$Hash_{1...[M+1]}$ (one or more attributes of the packet flow), corresponding to flow mapper node 140(M+1), where "1 . . . [M+1]" is the list of flow mapper nodes after the addition of flow mapper node M+1. In one example, the one or more attributes of the packet flow consists of the 5-tuple of the packet flow. In one form, the 5-tuple may include source Internet Protocol (IP) address, source port number, destination IP address, destination port number and the protocol in use.

TABLE 1

Example of Flow State

| Flow State (5-tuple) | Flow Processing Entity (IP Address) |
| --- | --- |
| Flow attributes 1 (e.g., 5-Tuple 1) | IP Address of FO or alphanumeric identifier of FO |
| Flow attributes 2 (e.g., 5-Tuple 2) | IP Address of FO or alphanumeric identifier of FO |
| . . . | |

Table 1 above is an example of flow state saved at flow locator nodes and flow mapping nodes.

In FIG. 1, at 160, a packet flow is received by flow locator node 130(2) from endpoint 112(J) in the enterprise network 110. The flow locator node 130(2) uses one or more attributes of the packet flow (such as the 5-tuple) to determine the flow mapper node, of the plurality of flow mapper nodes 140(1)-140(M), which has the flow state information for the received packet flow, e.g., flow mapper node 140(1). At 162, the flow locator node 130(2) sends the flow lookup request along with packet (or flow attributes) to flow mapper node 140(1). Flow mapper node 140(1) does a lookup using the packet (or flow attributes), i.e., the 5-tuple, and identifies the FO, among the plurality of flow locator nodes 130(1)-130(N) At 164, the flow mapper node 140(1) sends a flow lookup reply back to flow locator node 130(2). At 166, the flow locator node 130(2) then forwards the packet for the packet flow to the endpoint 120.

A similar process is followed for packets of the return flow in the opposite direction from the flow destination endpoint 120. At 170, the flow destination endpoint 120 sends a packet that is received by flow locator node 130(5), which in turn at 172 sends a flow lookup request and the packet to flow mapper node 140(1). Flow mapper node 140(1) returns a reply, at 174, to the flow locator node 130(5), the reply indicating that the flow locator node 130(5) is to forward the packet to flow locator node 130(2) at 176, which in turn forwards the packet to the endpoint 112(J) at 178.

Flow owner lookup for an existing flow only happens when a flow locator function does not have flow state (it is neither an FO or an FF). This can occur when flow state ages out, flow state is deleted, or a link/path/number of FLs changes. Also, a new flow mapper node may be added, as shown at 140(M+1) in FIG. 1. This new flow mapper node may not have flow state information for any or all flows at any given time. For all flows that may have a flow owner lookup request sent to flow mapper node 140(M+1), the flow states would need to be bulk transferred (bulk synchronized) from flow mapper node 140(1) to flow mapper node 140(M+1). This same holds true for other flow mapper nodes (they would need to bulk synchronization to flow mapper node 140(M+1)). This is shown at 180 and 182 in FIG. 1, and this bulk synchronization is highly undesirable because it requires lots of bandwidth, computation resources and time.

A solution is presented herein to avoid bulk synchronization of flow state upon cluster membership changes. This solution involves leveraging periodic flow state update/keepalive for state recovery. Flow state is transferred from a previous flow mapper node to a new flow mapper node only when explicitly requested. This solution achieves improved performance by direct messaging between entities serving the flow, and eliminating bulk synchronization operations. In addition, auto-discovery of a flow mapper may be enabled by using an external serverless function, distributed data store, or a management system, as described further hereinafter.

Newly Added Flow Mapper (M+1) without Bulk Synchronization

Figure 2:
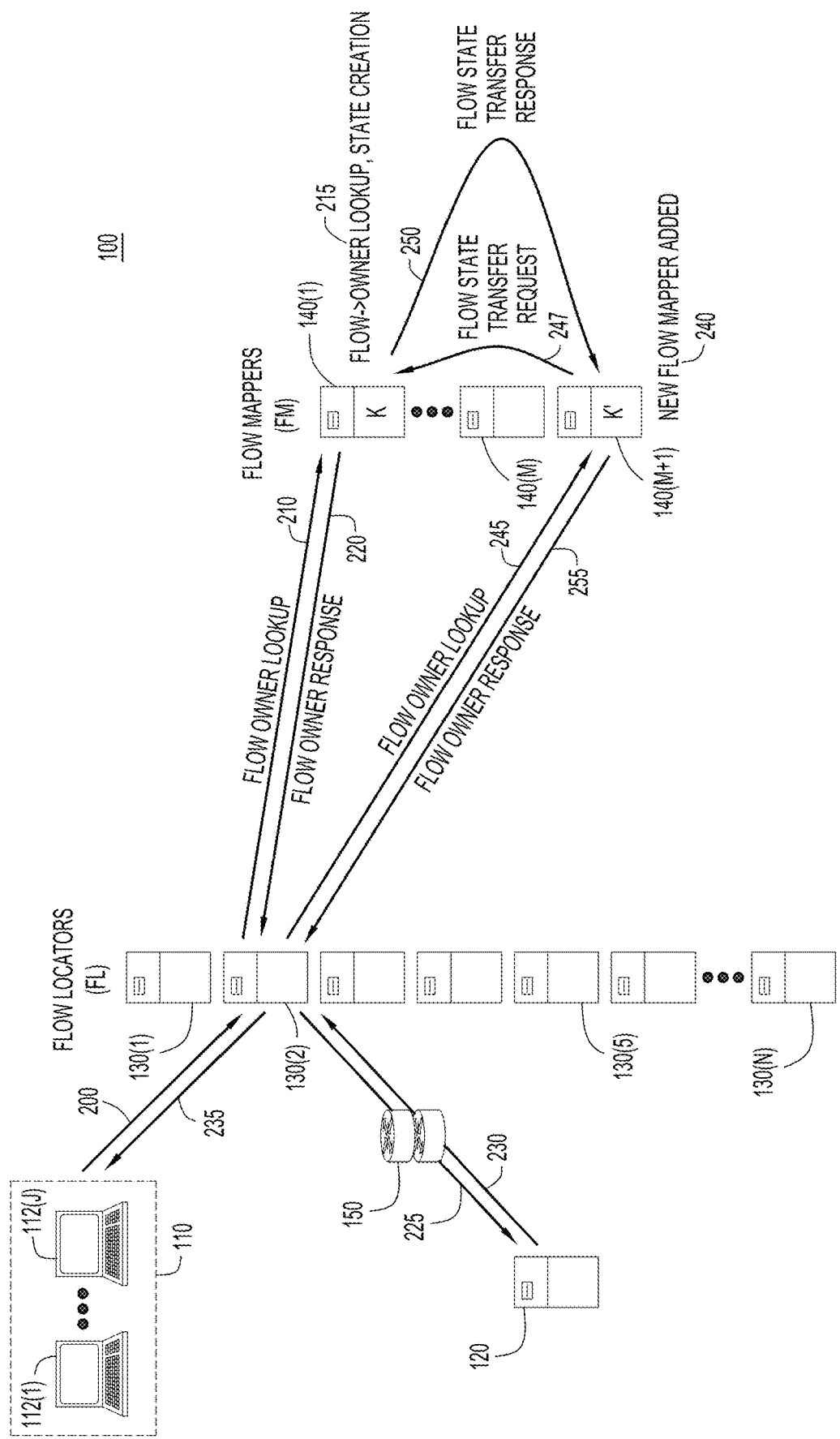
FIG. 2 is a diagram of the network environment shown in FIG. 1, and illustrating a process for transferring a flow owner request from a new flow mapper node to a previously existing flow mapper node, according to an example embodiment.

Reference is made to FIG. 2 for a description of a technique according to an example embodiment. FIG. 2 shows a network environment, similar to that shown in FIG. 1. As explained above, the flow locator nodes and flow mapper nodes use the same hash computation/formulate to identify a flow mapper. This is used for existing flow mapper nodes and also for new flow mapper nodes. That is, $Hash_{1...M}$ (one or more packet flow attributes) is used when there are M flow mapper nodes and $Hash_{1...[M+1]}$ (one or more packet flow attributes) is used when there are M+1 flow mapper nodes. This hash function is only an example, and any other deterministic computation could be used that is based on one or more packet flow attributes (e.g., the 5-tuple) of the packet flow and number of flow mapper nodes at a given instant of time.

At 200, a packet flow from endpoint 112(J) is received by flow locator node 130(2). At 210, the flow locator node 130(2) sends a flow owner lookup request, to the flow mapper node 140(1), based on the computation $Hash_{1...M}$ (one or more packet flow attributes) since the flow locator node 130(2) knows, at this time, that there are M flow mappers. Assume, for the sake of example, that this packet flow is a new packet flow. Thus, at 215, the flow mapper node 140(1) determines, in doing a flow owner lookup, that there is no flow owner assigned to this packet flow and creates a state entry to assign a flow owner to this packet flow. At 220, the flow mapper node 140(1) sends a flow owner response to the flow locator node 130(2) indicating that the flow owner for this packet flow is, for example, flow locator node 130(2). Flow locator node 130(2) performs the necessary processing on the packet.

At 225, the flow locator node 130(2) forwards the packet(s) for the packet flow to the flow destination endpoint 120. Inbound traffic, shown at 230, from the flow destination endpoint 120 to the endpoint 112(J) is processed by the flow locator node 130(2) which forwards the traffic to the endpoint 112(J) at 235, assuming the flow locator node 130(2) permits the traffic, according to one or more policies.

At some time later, a new flow mapper node, flow mapper node 140(M+1) is added, as shown at 240. For most existing flows, the flow locators will send periodic flow state updates (active)/keepalives (idle) to the new flow mapper node; these flows do not need state transfer between flow mapper nodes. However, in some limited cases, flow owner lookups are sent to the new flow mapper node, as now described in connection with FIG. 2.

At 245, the flow locator node 130(2) sends a flow owner lookup request for a packet of a new flow, based on the computation $Hash_{1 \ldots [M+1]}$ (one or more packet flow attributes), since the flow locator node 130(2) knows that there is a new flow mapper node 140(M+1) (according to techniques described below in connection with FIG. 4). Flow mapper node 140(M+1) receives the flow owner lookup request and determines that it does not have stored flow state and, at 247, uses the computation $Hash_{1 \ldots M}$ (one or more packet flow attributes) to transfer the flow owner lookup request to a flow mapper node that does have stored flow state. The flow mapper node 140(M+1) is configured to know that the computation $Hash_{1 \ldots M}$ (one or more packet flow attributes) is the hash computation used to identify the previous flow mapper node used before the new flow mapper node 140(M+1) was added, and that the previous flow mapper node will have the flow state. Therefore, flow mapper node 140(M+1) forwards/transfers the flow owner lookup request to the flow mapper node 140(1), determined/identified using the computation $Hash_{1 \ldots M}$ (one or more packet flow attributes). At 250, the flow mapper node 140(1) provides the flow owner information for this packet flow back to the flow mapper node 140(M+1). Thus, flow mapper node 140(M+1) determines the correct flow mapper node from which to retrieve the flow state for this packet flow, and at 255, sends a flow owner response to the flow locator node 130(2), the flow owner response including the identity of the flow owner for this packet flow. Thus, according to the example embodiment shown in FIG. 2, the new flow mapper node will retrieve flow state from a previous flow mapper and serve the flow owner lookup request in that manner. Moreover, at this point in time, the new flow mapper node can update stored data indicating the mapping this particular packet flow to a corresponding flow owner.

Figure 3:
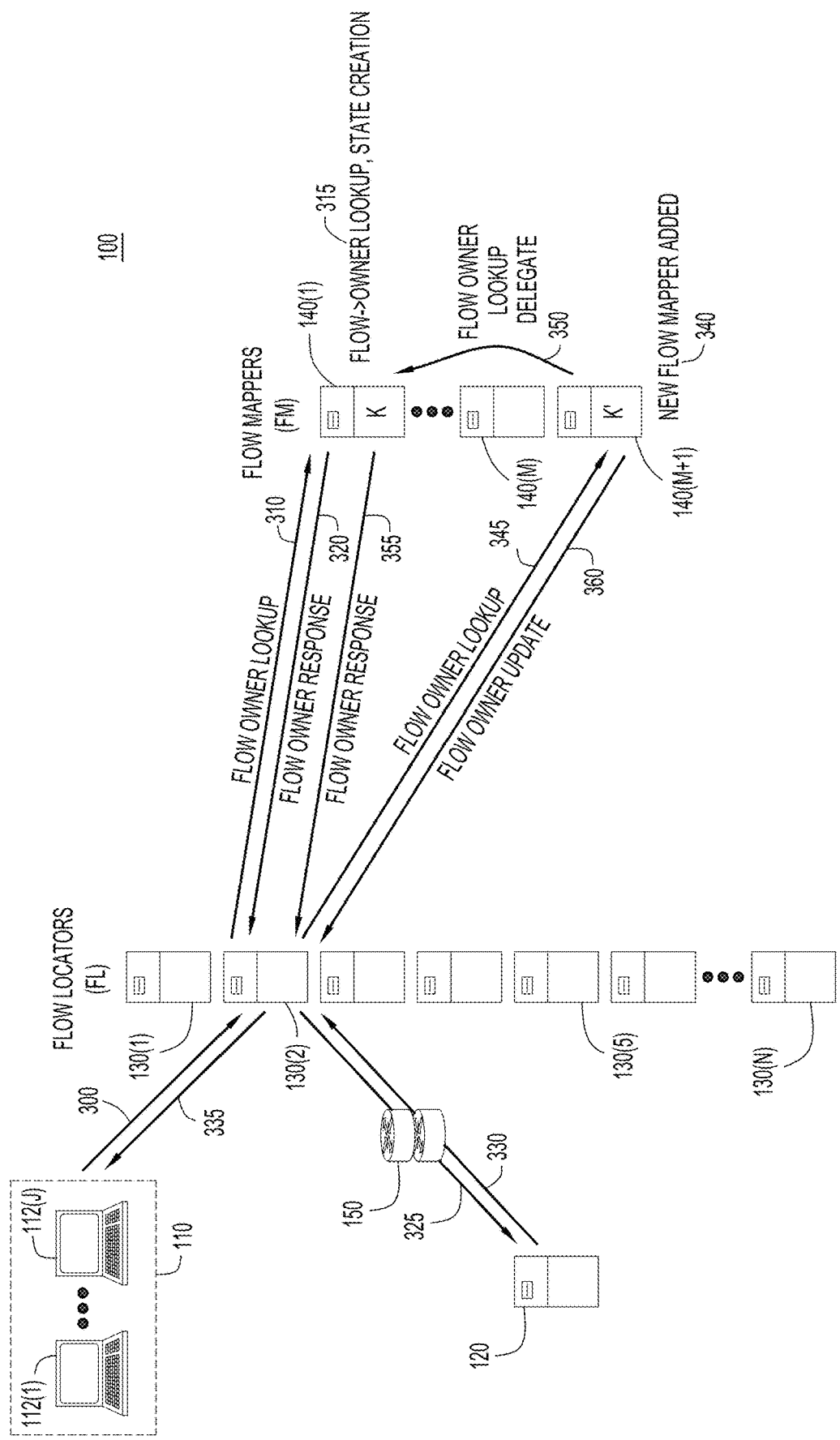
FIG. 3 is a diagram of the network environment shown in FIG. 1, and illustrating a process for delegating a flow owner request from a new flow mapper node to a previously existing flow mapper node, according to an example embodiment.

Reference is now made to FIG. 3 for description of a technique according to another example embodiment. In this embodiment, the new flow mapper node delegates the previous flow mapper node to serve the flow owner lookup request. There is no need to transfer flow state between flow mappers. The flow locator node will send the flow state update to new flow mapper node after receiving flow owner response from the delegated flow mapper node.

Operations 300, 310, 315, 320, 325, 330, 335, 340 and 345 are similar to operations 200-245 described above in connection with FIG. 3. However, after determining/identifying the previous flow mapper node (that has the flow), instead of retrieving the flow state (flow owner) information from the previous flow mapper node, the new flow mapper node 140(M+1) sends to the previous flow mapper node 140(1), a flow owner lookup delegate request at 350. The flow owner lookup delegate request includes an indication/identifier of the flow locator node that sent the flow owner lookup request (at 345) so that the flow mapper node 140(1) can retrieve the stored flow state (flow owner) information and send a flow owner response directly back to the flow locator node 130(2) that originated the flow owner lookup request, as shown at 355. The flow locator node 130(2) can then forward the packet to the appropriate flow locator node based on information contained in the flow owner response obtained at 355. In addition, at 360, the flow locator node 130(2) sends the flow state (flow owner) information for this packet flow to the new flow mapper node 140(M+1).

Thus, as explained above in connection with FIGS. 2 and 3, when a new flow mapper node does not have flow state for a flow owner lookup request during the period of receiving flow state update/keepalive, the new flow mapper node can find the previous flow mapper node using the previous hash computation for flow mapper list. If there are multiple changes to the flow mapper list, each has computation of the flow mapper list prior to a change event can be used for flow mapper selection (i.e., flow mapper list version).

Flow Mapper List Maintenance

Figure 4:
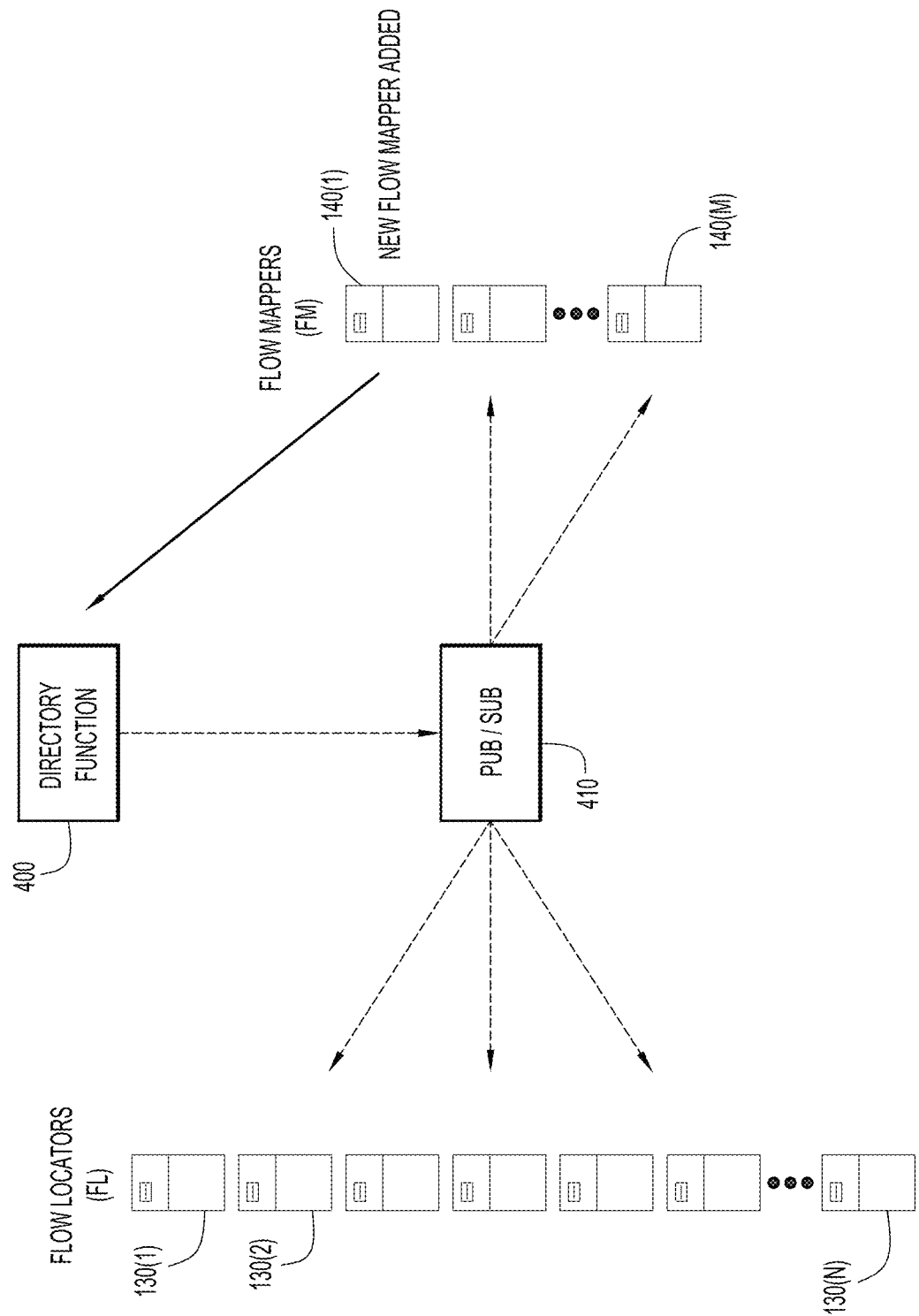
FIG. 4 is a diagram showing a directory function to update changes in flow mapper nodes and flow locator nodes, according to an example embodiment.

Reference is now made to FIG. 4. An external directory function or service 400 is provided that serves as a cluster directory and learns about any changes in the cluster (additions, deletions, etc.) of flow locators and flow mappers. When a new flow mapper node is added, flow locators and other flow mappers learn via a notification from the directory function 400. This ensures that all entities have the same flow mapper list and can maintain versioning of the flow mapper list to select the right flow mapper in order to retrieve the flow state for a given packet flow. The notifications to the flow locators and flow mappers may be made via a publication/subscription mechanism 410 that is communicating with the directory function. The directory function 400 may take the form of an external serverless function, an external data store, or a management system.

Figure 5:
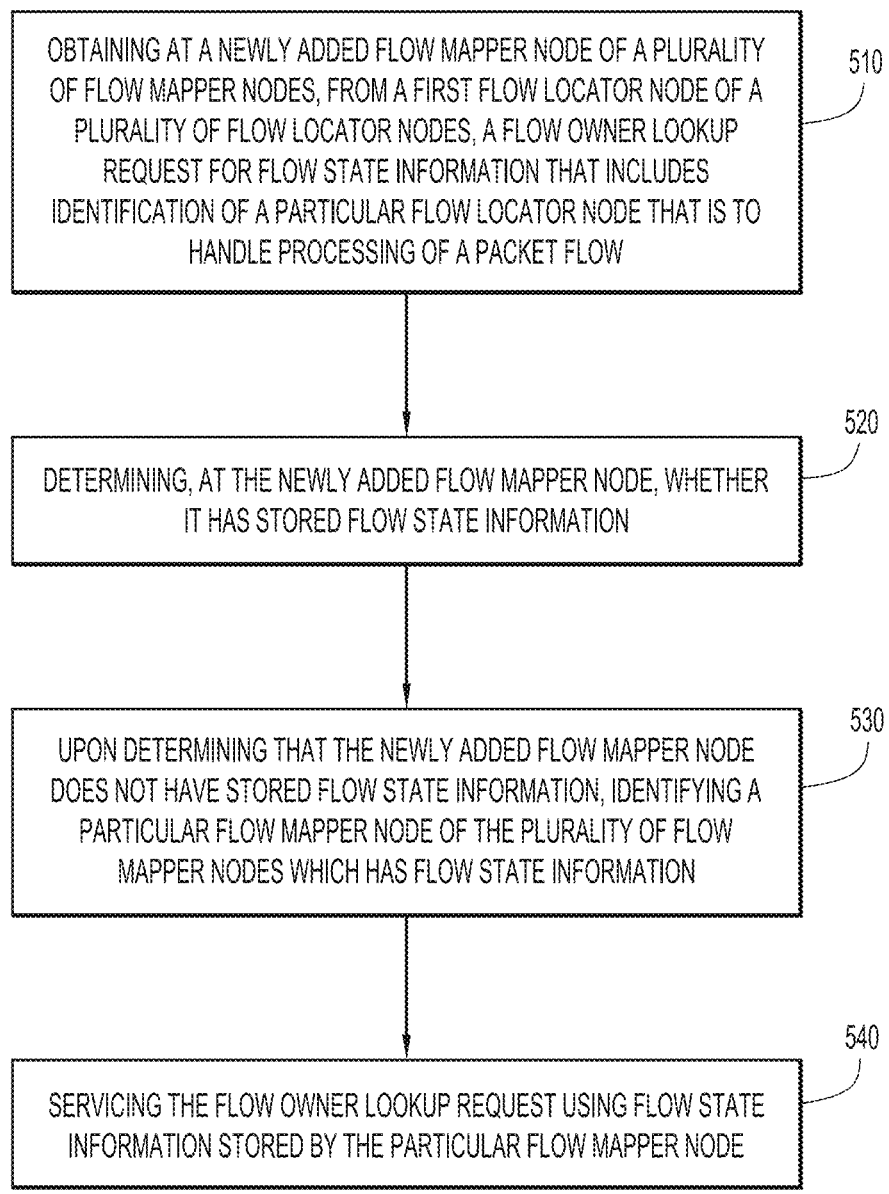
FIG. 5 is a flow chart of a method for efficiently handling packet processing requests by a cluster of packet processing entities, according to an example embodiment.

Turning now to FIG. 5, a flow chart is shown that depicts operations of a method 500. The method 500 is performed by a flow mapper node, and in particular a newly added flow mapper node, in accordance with the concepts described above in connection with FIGS. 3 and 4. At 510, a newly added flow mapper node (of a plurality of flow mapper nodes) obtains from a first flow locator node of a plurality of flow locator nodes, a flow owner lookup request for flow state information that includes identification of a particular flow locator node that is to handle stateful processing of a packet flow. The first flow locator node may be any of the plurality flow locator nodes. At 520, the newly added flow mapper node determines whether it has stored flow state information. At 530, upon determining that the newly added flow mapper node does not have stored flow state information, the newly added flow mapper node identifies another flow mapper node (arbitrarily called a "particular" flow mapper node) of the plurality of flow mapper nodes which has flow state information. At 540, the newly added flow mapper node services the flow owner lookup request using flow state information stored by the particular flow mapper node.

In one example embodiment, as depicted in FIG. 2, the operation 540 of servicing the flow owner lookup request includes: the newly added flow mapper node providing a flow state transfer request to the particular flow mapper node; obtaining at the newly added flow mapper node, a flow state transfer response from the particular flow mapper node, the flow state transfer response including information identifying the particular flow locator node; and the newly added flow mapper providing to the first flow locator node a flow owner response that includes the information identifying the particular flow locator node.

In another example embodiment, as depicted in FIG. 3, the operation 540 of servicing the flow owner lookup request includes: the newly added flow mapper node providing a flow owner lookup delegation request to the particular flow mapper node, the flow owner lookup delegation request causing the particular flow mapper node to provide to the first flow locator node a flow owner response that includes information identifying the particular flow locator node. Moreover, after delegating the flow owner transfer request, the newly added flow mapper node will obtain, from the first flow locator node, flow state information for the packet flow, including identification of the particular flow locator node. That is, the first flow locator will provide to the newly added flow mapper node, the flow state information, including the identity of the particular flow locator node for the packet flow.

As described above, the plurality of flow locator nodes and the plurality of flow mapper nodes each use the same hash computation to identify which flow mapper node of the plurality of flow mapper nodes stores flow state information for a given packet flow. The hash computation is based on a list of flow mapper nodes and one or more packet parameters of the given packet flow, e.g., $Hash_{1 \ldots M}$ (5-tuple). Thus, in one form, operation 530 of identifying the particular flow mapper node includes computing the hash computation based on the list of flow mapper nodes prior to adding the newly added flow mapper node to the plurality of flow mapper nodes. For example, if the newly added flow mapper node is flow mapper node M+1, then the newly added flow mapper node computes the hash computation $Hash_{1 \ldots M}$ (5-tuple) to identify the particular flow mapper node that has the flow state information for the packet flow.

As described above in connection with FIG. 4, the newly added flow mapper node may obtain from an external directory function, information about additions and/or deletions of flow mapper nodes to/from the plurality of flow mapper nodes.

FIG. 6 illustrates a hardware block diagram of a computing device 600 that may perform the functions of any of the entities or nodes referred to in connection with FIGS. 1-5. It should be appreciated that FIG. 6 provides only an illustration of one embodiment and does not imply any limitations with regard to the environments in which different embodiments may be implemented. Many modifications to the depicted environment may be made.

As depicted, the device 600 includes a bus 612, which provides communications between computer processor(s) 614, memory 616, persistent storage 618, communications unit 620, and input/output (I/O) interface(s) 622. Bus 612 can be implemented with any architecture designed for passing data and/or control information between processors (such as microprocessors, communications and network processors, etc.), system memory, peripheral devices, and any other hardware components within a system. For example, bus 612 can be implemented with one or more buses.

Memory 616 and persistent storage 618 are computer readable storage media. In the depicted embodiment, memory 616 includes random access memory (RAM) 624 and cache memory 626. In general, memory 616 can include any suitable volatile or non-volatile computer readable storage media.

One or more programs may be stored in persistent storage 618 for execution by one or more of the respective computer processors 614 via one or more memories of memory 616. The persistent storage 618 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information. For example, the one or more programs may include software instructions for Flow Mapper Control Logic 617A that, when executed by the one or more processors 614, cause the computing device 600 to perform the operations of a newly flow mapper node as depicted in FIGS. 2-5. In addition, the one or more programs may include software instructions for Flow Locator Control Logic 617B that, when executed by the one or more processors 614, cause the computing device 600 to perform the operations of a flow locator node as depicted in FIGS. 2-5. Further still, the one or more programs may include software instructions for packet flow processing logic 617C that, when executed by the one or more processors 614, cause the computing device 600 to perform flow processing operations (e.g., network security operations) on packets of a packet flow.

The media used by persistent storage 618 may also be removable. For example, a removable hard drive may be used for persistent storage 618. Other examples include optical and magnetic disks, thumb drives, and smart cards that are inserted into a drive for transfer onto another computer readable storage medium that is also part of persistent storage 618.

Communications unit 620, in these examples, is a communication interface provides for communications with other data processing systems or devices. In these examples, communications unit 620 includes one or more network interface cards. Communications unit 620 may provide communications through the use of either or both physical and wireless communications links.

I/O interface(s) 622 allows for input and output of data with other devices that may be connected to computer device 600. For example, I/O interface 622 may provide a connection to external devices 628 such as a keyboard, keypad, a touch screen, and/or some other suitable input device. External devices 628 can also include portable computer readable storage media such as database systems, thumb drives, portable optical or magnetic disks, and memory cards.

Software and data used to practice embodiments can be stored on such portable computer readable storage media and can be loaded onto persistent storage 618 via I/O interface(s) 622. I/O interface(s) 622 may also connect to a display 630. Display 630 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The present embodiments may employ any number of any type of user interface (e.g., Graphical User Interface (GUI), command-line, prompt, etc.) for obtaining or providing information (e.g., data relating to providing enhanced delivery options), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as C++, Python, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As explained above, the number of flow locator nodes and/or flow mapper nodes may change from time-to-time. In current systems, when this happens, a bulk synchronization of flow state is needed whereby all nodes share their flow state when there is a change. It is highly beneficial to avoid having to do a bulk synchronization because it consumes a substantial amount of computing computer resources/computing time. This is even more important in a virtual and cloud environment which can be highly dynamic (adding/deleting nodes).

According to the techniques presented herein, the synchronization of flow state for a newly added flow mapper is performed when the flow locator node hashes to a flow mapper node that is a new flow mapper node which does not have the state information for a given packet flow, and instead obtains the flow state from one of the other flow mapper nodes. Only the active flow mapper nodes need to maintain state. Older flow mapper nodes can age out and it is not a concern whether or not they have the updated state.

Using the techniques presented herein, a (newly added) service instance/node can selectively retrieve state from the right state owner in a distributed system without requiring expensive bulk synchronization. The newly added service instance can choose to delegate the previous state owner in a distributed system without requiring any state transition. Moreover, these techniques may involve leveraging an external directory function in order to discover cluster members in an environment where the typical network broadcast-based approach is not viable, e.g. any public cloud fabric. These techniques minimize degradation to cluster performance when auto-scaling a distributed system built for stateful scalability and availability.

Thus, according to one embodiment, a method is provided comprising: obtaining at a newly added flow mapper node of a plurality of flow mapper nodes, from a first flow locator node of a plurality of flow locator nodes, a flow owner lookup request for flow state information that includes identification of a particular flow locator node that is to handle processing of a packet flow; determining, at the newly added flow mapper node, whether it has stored flow state information; upon determining that the newly added flow mapper node does not have stored flow state information, identifying a particular flow mapper node of the plurality of flow mapper nodes which has flow state information; and servicing the flow owner lookup request using flow state information stored by the particular flow mapper node.

In another form, an apparatus is provided comprising: a communication interface configured to enable network communications, including communication with a plurality of flow mapper nodes and a plurality of flow locator nodes; one or more memories configured to store flow state information for one or more packet flows; and a processor coupled to the communication interface, wherein the processor is configured to perform operations including: obtaining from a first flow locator node of a plurality of flow locator nodes, a flow owner lookup request for flow state information that includes identification of a particular flow locator node that is to handle processing of a packet flow; determining whether the memory has stored flow state information; upon determining that the memory does not have stored flow state information for, identifying a particular flow mapper node of the plurality of flow mapper nodes which has flow state information; and servicing the flow owner lookup request using flow state information stored by the particular flow mapper node.

In accordance with another form, one or more non-transitory computer readable storage media are provided encoded with software comprising computer executable instructions and when the software is executed operable to perform operations including: obtaining at a newly added flow mapper node of a plurality of flow mapper nodes, from a first flow locator node of a plurality of flow locator nodes, a flow owner lookup request for flow state information that includes identification of a particular flow locator node that is to handle processing of a packet flow; determining, at the newly added flow mapper node, whether it has stored flow state information; upon determining that the newly added flow mapper node does not have stored flow state information, identifying a particular flow mapper node of the plurality of flow mapper nodes which has flow state information; and servicing the flow owner lookup request using flow state information stored by the particular flow mapper node.

In the case where the functions of the flow mapper node and flow locator node are performed within the same node/entity, the techniques presented herein have utility. In this case, the method involves obtaining at a newly added flow processing node of a plurality of flow processing nodes, a flow owner lookup request for flow state information that includes identification of a particular flow processing node that is to handle processing of a packet flow; determining, at the newly added flow processing node, whether it has stored flow state information; upon determining that the newly added flow processing node does not have stored flow state information, identifying a particular flow processing node of the plurality of flow mapper nodes which has flow state information; and servicing the flow owner lookup request using flow state information stored by the processing flow mapper node.

The obtaining operation may include obtaining the flow owner lookup request for a first flow processing node of the plurality of flow processing nodes.

In one form, servicing the flow owner lookup request may include: the newly added flow processing node providing a flow state transfer request to the particular flow processing node; obtaining at the newly added flow processing node, a flow state transfer response from the particular flow processing node, the flow state transfer response including information identifying the particular flow processing node; and the newly added flow processing node providing to the first flow processing node a flow owner response that includes the information identifying the particular flow processing node.

In another form, servicing the flow owner lookup request may include: the newly added flow processing node providing a flow owner lookup delegation request to the particular flow processing node, the flow owner lookup delegation request causing the particular flow processing node to provide to the first flow processing node a flow owner response that includes the information identifying the particular flow processing node. The method may further include obtaining, at the newly added flow mapper node, from the first flow processing node, flow state information for the packet flow, including identification of the particular flow processing node.

The plurality of flow processing nodes may each use the same hash computation to identify which flow processing node of the plurality of flow processing nodes stores flow state information for a given packet flow. The hash computation is based on a list of flow mapper nodes and one or more packet parameters of the packet flow. Thus, identifying the particular flow mapper node may include computing the hash computation based on the list of flow mapper nodes prior the newly added flow mapper node being added to the plurality of flow mapper nodes.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   obtaining at a newly added flow mapper node of a plurality of flow mapper nodes, from a first flow locator node of a plurality of flow locator nodes, a flow owner lookup request for flow state information that includes identification of a particular flow locator node that is to handle processing of a packet flow;
   determining, at the newly added flow mapper node, whether it has stored flow state information;
   upon determining that the newly added flow mapper node does not have stored flow state information, identifying a particular flow mapper node of the plurality of flow mapper nodes which has flow state information; and
   servicing the flow owner lookup request using flow state information stored by the particular flow mapper node.

2. The method of claim 1, wherein servicing the flow owner lookup request includes:
   the newly added flow mapper node providing a flow state transfer request to the particular flow mapper node;

obtaining at the newly added flow mapper node, a flow state transfer response from the particular flow mapper node, the flow state transfer response including information identifying the particular flow locator node; and the newly added flow mapper node providing to the first flow locator node a flow owner response that includes the information identifying the particular flow locator node.

3. The method of claim 1, wherein servicing the flow owner lookup request includes:

the newly added flow mapper node providing a flow owner lookup delegation request to the particular flow mapper node, the flow owner lookup delegation request causing the particular flow mapper node to provide to the first flow locator node a flow owner response that includes information identifying the particular flow locator node.

4. The method of claim 3, further including:

obtaining, at the newly added flow mapper node, from the first flow locator node, flow state information for the packet flow, including identification of the particular flow locator node.

5. The method of claim 1, wherein the plurality of flow locator nodes and the plurality of flow mapper nodes each use the same hash computation to identify which flow mapper node of the plurality of flow mapper nodes stores flow state information for the packet flow.

6. The method of claim 5, wherein the hash computation is based on a list of flow mapper nodes and one or more packet parameters of the packet flow.

7. The method of claim 6, wherein identifying the particular flow mapper node includes computing the hash computation based on the list of flow mapper nodes prior the newly added flow mapper node being added to the plurality of flow mapper nodes.

8. The method of claim 1, further comprising:

obtaining at the newly added flow mapper node from a directory function, information about additions and/or deletions of flow mapper nodes.

9. An apparatus comprising:

a communication interface configured to enable network communications, including communication with a plurality of flow mapper nodes and a plurality of flow locator nodes;

one or more memories configured to store flow state information for one or more packet flows; and a processor coupled to the communication interface, wherein the processor is configured to perform operations including:

obtaining from a first flow locator node of a plurality of flow locator nodes, a flow owner lookup request for flow state information that includes identification of a particular flow locator node that is to handle processing of a packet flow;

determining whether the memory has stored flow state information;

upon determining that the memory does not have stored flow state information for, identifying a particular flow mapper node of the plurality of flow mapper nodes which has flow state information; and servicing the flow owner lookup request using flow state information stored by the particular flow mapper node.

10. The apparatus of claim 9, wherein servicing the flow owner lookup request includes the processor:

providing a flow state transfer request to the particular flow mapper node;

obtaining a flow state transfer response from the particular flow mapper node, the flow state transfer response including identification of the particular flow locator node; and providing to the first flow locator node a flow owner response that includes information identifying the particular flow locator node.

11. The apparatus of claim 9, wherein servicing the flow owner lookup request includes the processor:

providing a flow owner lookup delegation request to the particular flow mapper node, the flow owner lookup delegation request causing the particular flow mapper node to provide to the first flow locator node a flow owner response that includes information identifying the particular flow locator node.

12. The apparatus of claim 9, wherein the processor is further configured to perform:

obtaining from the first flow locator node flow state information for the packet flow, including identification of the particular flow locator node.

13. The apparatus of claim 9, wherein the plurality of flow locator nodes and the plurality of flow mapper nodes each use the same hash computation to identify which flow mapper node of the plurality of flow mapper nodes stores flow state information for the packet flow, wherein the hash computation is based on a list of flow mapper nodes and one or more packet parameters of the packet flow.

14. The apparatus of claim 13, wherein the processor performs identifying the particular flow mapper node by computing the hash computation based on the list of flow mapper nodes prior to the apparatus being added to the plurality of flow mapper nodes.

15. One or more non-transitory computer readable storage media encoded with software comprising computer executable instructions and when the software is executed operable to perform operations including:

obtaining at a newly added flow mapper node of a plurality of flow mapper nodes, from a first flow locator node of a plurality of flow locator nodes, a flow owner lookup request for flow state information that includes identification of a particular flow locator node that is to handle processing of a packet flow;

determining, at the newly added flow mapper node, whether it has stored flow state information;

upon determining that the newly added flow mapper node does not have stored flow state information, identifying a particular flow mapper node of the plurality of flow mapper nodes which has flow state information; and servicing the flow owner lookup request using flow state information stored by the particular flow mapper node.

16. The non-transitory computer readable storage media of claim 15, wherein the instructions operable for servicing the flow owner lookup request include instructions for:

providing a flow state transfer request to the particular flow mapper node;

obtaining at the newly added flow mapper node, a flow state transfer response from the particular flow mapper node, the flow state transfer response including information identifying the particular flow locator node; and providing to the first flow locator node a flow owner response that includes the information identifying the particular flow locator node.

17. The non-transitory computer readable storage media of claim 15, wherein the instructions operable for servicing the flow owner lookup request include instructions for:

providing a flow owner lookup delegation request to the particular flow mapper node, the flow owner lookup delegation request causing the particular flow mapper node to provide to the first flow locator node a flow owner response that includes information identifying the particular flow locator node.

18. The non-transitory computer readable storage media of claim 17, wherein the instructions are further operable for:

obtaining from the first flow locator node, flow state information for the packet flow, including identification of the particular flow locator node.

19. The non-transitory computer readable storage media of claim 15, wherein the plurality of flow locator nodes and the plurality of flow mapper nodes each use the same hash computation to identify which flow mapper node of the plurality of flow mapper nodes stores flow state information for the packet flow of, wherein the hash computation is based on a list of flow mapper nodes and one or more packet parameters of the packet flow.

20. The non-transitory computer readable storage media of claim 19, wherein the instructions operable for identifying the particular flow mapper node include instructions for computing the hash computation based on the list of flow mapper nodes prior to the newly added flow mapper node being added to the plurality of flow mapper nodes.

\* \* \* \* \*